C. E. BONINE.
DYNAMO ELECTRIC MACHINE.
APPLICATION FILED DEC. 29, 1905.

1,047,158.

Patented Dec. 17, 1912.
2 SHEETS—SHEET 1.

Witnesses:
Thos. Howe
R. C. Crout

Inventor:
Charles E. Bonine
by Kennie Goldsborough,
Attys.

UNITED STATES PATENT OFFICE.

CHARLES EDWARD BONINE, OF ELIZABETH, NEW JERSEY, ASSIGNOR TO ELECTRO-DYNAMIC COMPANY, OF BAYONNE, NEW JERSEY, A CORPORATION OF NEW JERSEY.

DYNAMO-ELECTRIC MACHINE.

1,047,158.  Specification of Letters Patent.  Patented Dec. 17, 1912.

Application filed December 29, 1905. Serial No. 293,834.

*To all whom it may concern:*

Be it known that I, CHARLES E. BONINE, a citizen of the United States, residing at Elizabeth, Union county, New Jersey, have invented certain new and useful Improvements in Dynamo-Electric Machines; and I do hereby declare the following to be a full, clear, and exact description of the invention, such as will enable others skilled in the art to which it appertains to make and use the same.

My invention relates to improvements in direct current variable speed motors.

It has heretofore been recognized that to produce perfect commutation of variable speed motors, it is desirable to employ auxiliary poles which are located in the interpolar spaces, that is, the spaces between the main poles of the machine. The arrangement, construction and operation of these poles is well understood, and needs no further description.

Figure 1:
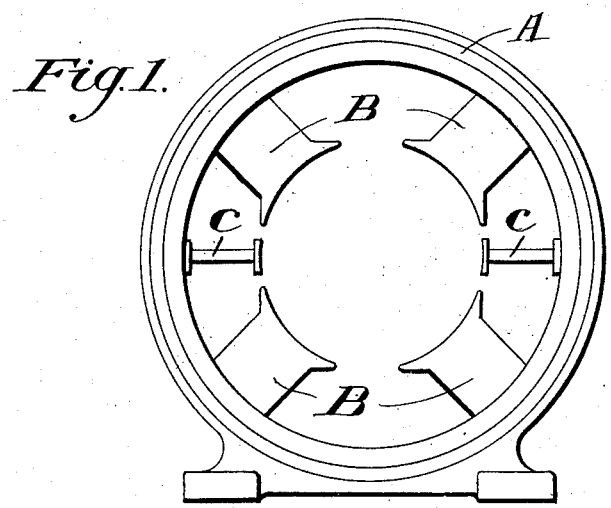
Figure 2:
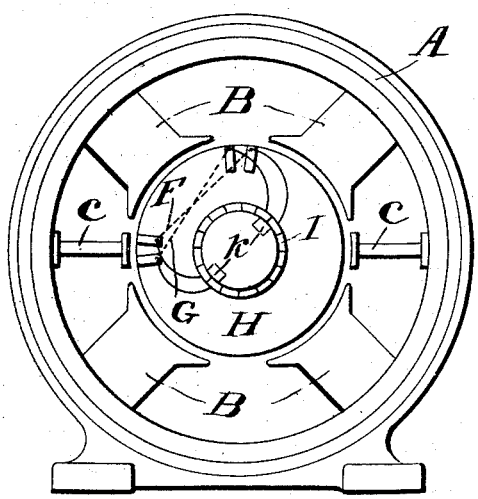
Figure 3:
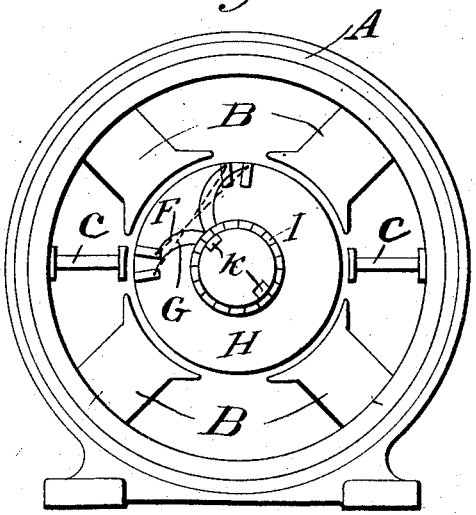
Figure 4:
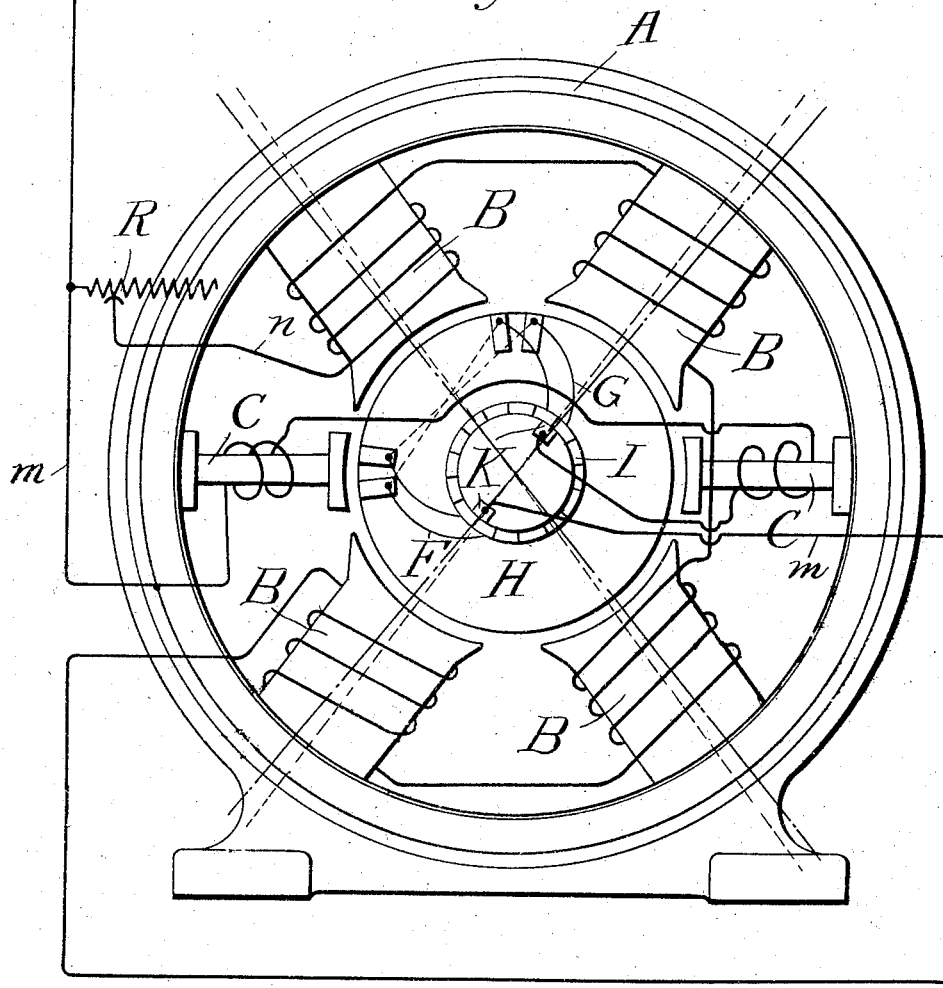

It is the object of the present invention, to secure the advantages of the machines as described, but to produce the desired results by an improved means, whereby the efficiency is increased. This is accomplished by reducing the number of commutating poles, heretofore employed, as will be more fully set forth hereinafter in connection with the accompanying drawings, in which, Figure 1 is a side elevation of a machine frame embodying the invention; Fig. 2 is a similar view of a machine in which the armature coils are of a series winding; Fig. 3 is a similar view of a machine, in which the armature coils are of a parallel winding. Fig. 4 is a view of a machine of this type, in which the field poles are arranged to take advantage of the interpolar spaces which do not contain compensating poles. The figure further illustrates diagrammatically the ordinary winding of a variable speed motor.

Referring to the drawings, it will be seen that the frame comprises the usual yoke A, on which are mounted the main poles B. Within the latter revolves the armature H having a winding, of which the two coils F and G only are shown, as this is sufficient to illustrate the invention. The armature is provided with the usual commutator I, and brushes K bearing thereon.

The machine thus far described is an ordinary dynamo electric machine, unprovided with commutating poles. As stated above, however, commutating poles have been employed, and it has been the practice to locate one pole in each interpolar space. The number of commutating poles was thus equal to the number of main poles. The coils for energizing the auxiliary poles were usually connected in series with the armature, so that the amount of energization was varied with the load put upon the machine. Each side of an armature coil being acted on by an auxiliary pole while the said armature coil was undergoing commutation, the entire commutating electromotive force generated in the coil was composed of the sum of the electromotive forces due to the auxiliary poles acting upon its two sides. The commutating poles were, therefore, wound with a suitable number of turns, and made of the required cross section, so that each would generate the proper electromotive force in one side of the coil undergoing commutation, which, when added to that generated in the other side of the coil, would produce the entire commutating electromotive force required. In the structures shown, the number of commutating poles C is reduced to one-half that of the main poles, and they are located in alternate interpolar spaces only, thus leaving the other alternate interpolar spaces unoccupied. The result is that these unoccupied spaces may be reduced, thus reducing the overall or outside dimensions of the machine for a given capacity, or, conversely, increasing its capacity for given over-all dimensions. The main poles may then be proportionately larger as shown in Fig. 4 or may carry a greater number of convolutions.

The commutating poles are each made of sufficient cross section and supplied with a sufficient number of turns to generate the entire commutating electromotive force required, in the side of the coil undergoing commutation to which the said pole is adjacent. It will be observed that since the commutating poles are in alternate interpolar spaces, they must all be of the same sign to effect commutation. The effect, in so far as the commutation of the coil is concerned, is to generate the entire commutating electromotive force in one portion of the coil, as, for instance, one side, instead, as has heretofore been the practice of generating fractions of this electromotive force in different portions of the coil, the sum of the different electromotive forces being equal to the total compensating effect required. This effect is accompanied by a reduction in the armature reaction and an increase of the polar fringing, whereby the efficiency of field excitation is increased. The winding upon the auxiliary poles may be connected in any of the well known relations to the winding of the machine or the circuit to which it is connected, but in Fig. 4 I have shown the common type of shunt wound variable speed motor in which the commutating poles are connected in the circuit $m$ in series with the armature and the main field poles are connected in the shunt circuit $n$ containing the variable resistance R. I may state, further, that the use of a lesser number of auxiliary poles, in accordance with my invention, is attended not only with a reduction in the work necessary to incorporate the auxiliary pole pieces in the manufacture of the field frame and in the cost of winding the coils, but I also find that, in practice, a less amount of copper is required for the smaller number of auxiliary poles. I have furthermore discovered that this construction has a marked tendency to reduce the hunting which occurs in machines of this type having the same number of interpoles as main poles.

Having thus described my invention, what I claim and desire to secure by Letters Patent is:—

1. A variable speed electric motor having a plurality of main poles and a plurality of commutating poles located in alternate interpolar spaces, the commutating poles being all of the same sign; substantially as described.

2. In a variable speed electric motor, four or more main poles and half as many commutating poles located in alternate interpolar spaces, the energizing winding on each commutating pole connected in series with the armature, the connections being such that all the commutating poles are of the same sign; substantially as described.

3. In a variable speed electric motor, a plurality of main poles, armature coils having their two sides in successive interpolar spaces, and a plurality of commutating poles of the same sign so located that each armature coil is acted upon by but one commutating pole; substantially as described.

4. A main frame for a dynamo-electric machine, comprising a plurality of main poles and commutating poles located in alternate interpolar spaces only, the main poles being unsymmetrically spaced about the armature to reduce the interpolar spaces which do not contain commutating poles; substantially as described.

5. A dynamo electric machine having spaces of different extent between the cores of the main field poles, and an interpole located in the larger inter-core space.

In testimony whereof I affix my signature, in presence of two witnesses.

CHARLES EDWARD BONINE.

Witnesses:
 EDWIN MELCHER SMITH,
 JOHN F. TENDEAN.

Copies of this patent may be obtained for five cents each, by addressing the "Commissioner of Patents, Washington, D. C."